United States Patent Office 3,311,587
Patented Mar. 28, 1967

3,311,587
POLYPHENYLENE OXIDES EXTENDED WITH ELEMENTAL SULFUR
Daniel W. Fox, Pittsfield, Mass., assignor to General Electric Company, a corporation of New York
No Drawing. Filed Mar. 10, 1965, Ser. No. 438,753
7 Claims. (Cl. 260—37)

This invention relates to an extender for polyphenylene oxide plastics. More particularly, this invention relates to the use of elemental sulfur as an extender for polyphenylene oxide plastics. This invention also relates to a polyphenylene oxide plastic composition exhibiting unexpectedly high tensile strength and resistance to embrittlement at elevated temperatures.

The polyphenylene oxides are a new body of plastics which fill a significant gap in the property spectrum of the plastics industry. They are an entirely new family of engineering-type thermoplastics, produced by an entirely new polymerization system, and characterized by a unique combination of properties. These plastics show a useful temperature range of more than 600° F. extending from a brittle point of −275° F. to a heat distortion temperature of 375° F. In addition, they show a high resistance to hydrolytic breakdown as well as to acid and bases. The material has a low moisture absorption, non-toxicity, resistance to staining, and non-dripping self-extinguishability. The polyphenylene oxides also have oustanding mechanical properties such as a tensile modulus of 350,000 to 380,000 p.s.i. and are able to withstand high loads at elevated temperatures for prolonged periods of time. In addition to the outstanding chemical and mechanical properties, the polyphenylene oxides also have excellent electrical characteristics such as dielectric strengths of between 400–500 volts/mil in thick sections over a broad range of cycles and temperatures. This dielectric strength is equal to or better than nearly all common thermoplastics.

While this outstanding combination of properties renders the polyphenylene oxide amenable to a wide variety of commercial applications, their use is somewhat impaired by high cost. In general, it has been the practice in the art to dilute the higher-priced resins with a material which is relatively inexpensive and which will not impair the desirable properties of the resin. This material is called an extender. The difficulty heretofore encountered is that while these extenders have been dispersed in plastics to reduce costs, such reduction in cost is usually at the expense of one or more properties of the plastic. I have now unexpectedly found that I can employ relatively inexpensive elemental sulfur as an extender for the polyphenylene oxide plastics without impairing their outstanding properties and even more unexpectedly I have found that sulfur addition significantly increases tensile strength as well as resistance to embrittlement at elevated temperatures. These results are particularly surprising as heretofore, it was believed that sulfur was not soluble in organic plastics. This solubility is a distinct advantage in that it enables one to produce transparent objects as opposed to normally opaque filled compounds. Furthermore, because of the yellow coloration of sulfur, it was believed that addition of surfur to a plastic material would result in discoloration of the plastic to such an extent as to substantially decrease its utility.

Accordingly, one object of this invention is to provide an extender for the polyphenylene oxide plastics.

Another object of this invention is to reduce the costs of the polyphenylene oxide plastics by incorporating therein an extender comprising elemental sulfur.

Still another object of this invention is to provide a polyphenylene oxide plastic composition having increased tensile strength.

A fourth object of this invention is to provide a polyphenylene oxide composition stabilized against embrittlement aging at elevated temperatures.

Still another object of this invention is to provide an extender for the polyphenylene oxide plastics which does not impair chemical, physical or electrical properties.

A further object of this invention is to provide a process for the preparation of polyphenylene oxide compositions containing elemental sulfur.

Other objects and advantages of this invention will be in part apparent and in part pointed out in the description which follows.

The polyphenylene oxides with which this invention is concerned have been described and claimed in copending U.S. patent application Ser. No. 212,128 of Allan S. Hay, filed July 24, 1962, and assigned to the same assignee as the present invention and incorporated herein by reference. In a preferred embodiment, they may be represented by the following general formula:

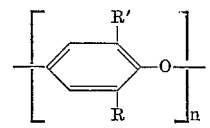

wherein R is a monovalent substituent selected from the group consisting of hydrogen, hydrocarbon radicals, halohydrocarbon radicals having at least two carbon atoms between the halogen atom and phenol nucleus, hydrocarbonoxy radicals, and halohydrocarbonoxy radicals having at least two carbon atoms between the halogen atom and phenol nucleus; R' is the same as R and in addition halogen; $n$ may represent any whole integer greater than 100.

The term "polyphenylene oxide" as used throughout this application is intended to mean both the substituted and unsubstituted polyphenylene oxides.

The expedient of employing extenders with various plastics is well known in the art. However, with practically every extender heretofore employed, there has been some detrimental effect in one or more of the properties of the plastic so extended. A fairly inclusive list of well-known extenders is set forth in Simonds and Ellis, "Handbook of Plastics," Van Nostrand Company. New York, 1943, Chapter 5.

Typical extenders heretofore employed include glass fiber, flake or powder; minerals such as asbestos powder and fiber, mica, talc, barium sulfite, quartz, chalk, calcite, gypsum, slate dust, ground soapstone, feldspar flour, ground shale, flint, silicate powder, diatomaceous earth, bauxite, kaolin and other clays, lime, litharge, magnesium oxide, titanium dioxide, etc.; metal dust such as aluminum powder, powdered iron, powdered steel, silicon alloys, etc.; paper, textiles; etc. Practically all of these materials have been tried with various polymers, but in most cases, these materials led to a loss of one or more desirable properties.

To the best of my knowledge, sulfur has only been used as an extender with highly carbonaceous materials such as cold molded bituminous—i.e., mineral pitch or asphalt. Sulfur has also been employed with natural and synthetic rubbers, but as a vulcanizing agent, not as an extender. The function of sulfur as a vulcanizing agent is totally different than that as an extender. At the present time, the mechanics of vulcanization are not fully understood. All that is known is that sulfur changes rubber from a plastic to a non-plastic material, it changes the solubility characteristics markedly, it increases the resistance to abrasion and reduces permanent set in compression set, and it enables rubber to retain its properties over a wide range of temperatures. Also, most importantly, sulfur enters into a chemical reaction with rubber when used as a vulcanizing agent. One double bond is always removed for each atom of sulfur chemically combined. When sulfur is used as an extender with the polyphenylene oxides, the sulfur apparently does not react with the plastic. Therefore, I believe that the addition of sulfur with the resultant increase in tensile stress is not due to a vulcanization type chemical reaction.

It is desirable that the elemental sulfur be dissolved or as homogeneously dispersed as fine particles in the polyphenylene oxide as possible. Thus, while ordinary dry blending techniques or ordinary methods of incorporating a filler in a plastic may be employed for dispersing particles of sulfur in polyphenylene oxide, I have found that I prefer to dissolve both the sulfur and the polyphenylene oxide in a solvent and collect the solids therefrom. This method has the advantages of a more homogeneous dispersion of sulfur in polyphenylene oxide and also prevents sulfur attack on hot metal surfaces. When dry blending equipment such as an extruder is employed, the sulfur may react with the metallic surface of the equipment to form undesirable sulfides. I have found that I can incorporate as much as 25 weight percent sulfur in polyphenylene oxide, however, when the concentration exceeds 20 weight percent sulfur, there is a loss in clarity —i.e., the polyphenylene oxide loses its transparency and develops a yellow, opaque characteristic. Thus, while maintaining some structural integrity, polyphenylene oxides containing more than 20 percent sulfur by weight are unsuitable for many commercial applications. I have found that any amount of sulfur up to 20 weight percent can be included in the polyphenylene oxide without any visible loss of optical clarity. It is desirable to include as much sulfur as possible as this substantially reduces the cost of the plastic. Therefore, from a practical standpoint, it is desirable to include at least 10 percent by weight sulfur additive. Accordingly, while sulfur may be included up to 25 weight percent, in a preferred embodiment of this invention, the sulfur constitutes between 10 and 20 weight percent of the composition.

The preferred method for incorporating sulfur in polyphenylene oxide comprises dissolving sulfur and polyphenylene oxide in a solvent and recovering the two materials therefrom. This may be accomplished by mixing each in a separate solvent and mixing the two solutions or by dissolving both in a mutual solvent. The polyphenylene oxide and sulfur may then be collected by distilling the solvent and collecting the residue. The residue is either a solid solution or a very fine dispersion of sulfur in polyphenylene oxide.

Typical solvents for the polyphenylene oxides include chloroform, ethylenedichloride, carbon tetrachloride, toluene, benzene, etc. The preferred solvent is chloroform.

Typical solvents for sulfur are carbon disulfide, chloroform, etc.

In a preferred embodiment of this invention, both polyphenylene oxide and sulfur are dissolved in carbon disulfide and the sulfur filled polyphenylene oxide recovered therefrom.

As stated above, the sulfur may also be added to the polyphenylene oxide by dry blending techniques. Thus, sulfur and polyphenylene oxide, preferably in powder form are mixed in a blender and the blend is then molded to the desired shape. An alternative procedure would be to mix the two compounds and pass the mixture through an extruder.

I have found that films of polyphenylene oxides containing elemental sulfur show increases in tensile strength of greater than 30 percent without impairment of other desirable properties. For example a 4 mil film of 100 percent poly-(2,6-dimethyl-1,4-phenylene)-oxide exhibited a tensile strength of 11,250 p.s.i. while a film of the same dimensions containing 2½ percent by weight sulfur exhibited a tensile strength of 18,225 p.s.i. A film with 10 percent sulfur exhibited a tensile strength of 16,200 p.s.i. In all of these films, there was no evidence of optical discontinuity—i.e., loss of transparency. This is an indication that the sulfur did dissolve in the polyphenylene oxide. As evidence of this dissolution, a sample of a film containing 10 percent sulfur was boiled for several hours in hot sodium hydroxide and another in concentrated sodium polysulfide, both solvents for the sulfur. After cooling and drying of the film, it was weighed and found that weight loss was nil. The film had maintained its structural integrity and was found to be glass-clear and shiny.

In addition, polyphenylene oxide films with sulfur additions are capable of withstanding elevated temperatures without embrittlement for longer periods of time than films without sulfur. For example, a film containing 10% sulfur was able to withstand a 180° flex after exposure of 1416 hours to a temperature of 160° C. A similar film without a sulfur additive broke after exposure of 1008 hours at the same elevated temperature.

Thus, by including sulfur as an extender for polyphenylene oxide, I have not only lowered the cost of the polyphenylene oxide, but I have also increased the tensile strength and temperature stability, maintained the excellent electrical properties of the polymer, and have produced a polymer free from optical discontinuity and degradation.

The following examples are illustrative of the process of preparing a polyphenylene oxide plastic having elemental sulfur contained therein as well as the physical properties possessed thereof. All percentages in the examples are by weight.

EXAMPLE 1

In this example, films were prepared from polyphenylene oxide containing various quantities of elemental sulfur. A poly-(2,6-dimethyl-1,4-phenylene)-oxide having an intrinsic viscosity of 0.71 deciliters per gram (dl./g.) as measured in chloroform at 30° C. was dissolved in 100 ml. of chloroform to form a 20 percent polymer solution. A second solution was prepared by dissolving sulfur in 100 ml. of carbon disulfide so as to form a 25 percent sulfur solution. Seven separate beakers were set aside and polyphenylene oxide solution added to each beaker. Thereafter, sulfur solution was added to each beaker. Enough sulfur solution was added to form a resultant polymer composition comprising 2.0, 2.5, 4.0, 5.0, 7.0, 10.0 and 18.0 percent sulfur in polyphenylene oxide, respectively. After the mixtures were prepared, the beakers were shaken on a laboratory shaker for a period of one-half hour to insure complete miscibility of the two solutions. Thereafter, films were prepared by dropping a few ml. of each solution on a glass plate and smoothing with a doctor blade. The coated glass plates were placed in an oven maintained at 80° C. and allowed to stand for a period of approximately 60 hours. Thereafter, each film was removed from a glass plate by cooling to room temperature and peeling the film from the plate with the aid of a water release agent. Each of the films was found to have a thickness of 4 mil. Each was examined for discoloration and optical clarity. In all cases, the films were transparent. A film containing 100 percent poly-(2,6-dimethyl-1,4-phenylene)-oxide was also prepared by the above procedure.

EXAMPLE 2

In this example, the procedure of Example 1 was repeated. The object of this example was to determine whether the results obtained in Example 1 were reproducible. Films containing 0, 2, 5, and 10 percent sulfur in polyphenylene oxide were produced. Again, the films produced were transparent.

EXAMPLE 3

In this example, the tensile strengths of the films containing 0, 2.0, 2.5, 4.0, 5.0, 7.0 and 10% sulfur of Example 1 were measured. Samples measuring ½" x 4"

were prepared from each film. Tensile strength was determined by pulling the films in an Instron tester at a crosshead speed of 20" per minute. For each of the films prepared in Example 1, three samples were tested. The following results were obtained:

*Table I.—Tensile strength of poly-(2,6-dimethyl-1,4-phenylene)-oxide films containing elemental sulfur extender*

| Sulfur content weight percent: | Tensile strength p.s.i. |
|---|---|
| 0 | 11,250 |
| 2.0 | 14,850 |
| 2.5 | 18,266 |
| 4.0 | 14,900 |
| 5.0 | 13,700 |
| 7.0 | 12,800 |
| 10.0 | 16,200 |

From the above results, it is apparent that the film containing no sulfur exhibited the lowest tensile strength and that with inclusions of sulfur up to 10 percent by weight, tensile strength was greatly improved. It is also apparent from the above table that there appears to be no consistency or relationship between the sulfur content and the increase in tensile strength.

EXAMPLE 4

In this example, tensile strengths were again measured using the procedure set forth in Example 3, but the films prepared in Example 2 were tested. The following results were obtained:

*Table II.—Tensile strength of poly-(2,6-dimethyl-1,4-phenylene)-oxide films containing elemental sulfur extender*

| Sulfur content weight: | Tensile strength p.s.i. |
|---|---|
| 0 | 8,600 |
| 2.0 | 9,900 |
| 5.0 | 9,400 |
| 10.0 | 10,000 |

Again, the sulfur additive caused a marked increase in tensile strength.

EXAMPLE 5

In this example, films containing 0, 2.5, 5, and 10% sulfur were tested for resistance to embrittlement by exposing the films to a temperature of 160° C. for prolonged periods of time. Films of each of the samples were hung in a beaker and placed in an oven maintained at 160° C. The samples were tested for embrittlement by periodically flexing an exposed film 180°. The test was discontinued for a film having a particular composition when three samples broke after flexing 180°. The following results were obtained:

*Table III.—Resistance to embrittlement of poly-(2,6-dimethyl-1,4-phenylene)-oxide films containing elemental sulfur*

| Test Time | 0% | 2.5% | 5% | 10% |
|---|---|---|---|---|
| 24 hrs | 180° Flex | 180° Flex | 180° Flex | 180° Flex. |
| 64 hrs | do | do | do | Do. |
| 216 hrs | do | do | do | Do. |
| 480 hrs | do | do | do | Do. |
| 720 hrs | do | do | do | Do. |
| 1,008 hrs | Broke | do | do | Do. |
| 1,056 hrs | | Broke | do | Do. |
| 1,224 hrs | | | Broke | Do. |
| 1,416 hrs | | | | Do.[1] |

[1] The sample containing 10% sulfur did not break within 1500 hours. At this point, the test was discontinued.

As can be seen from the above table, sulfur greatly enhanced the stability of polyphenylene oxides to aging at elevated temperatures.

It would, of course, be apparent to those skilled in the art that changes may be made in other particular embodiments of the invention described which are within the full intent and scope of the invention as defined by the appended claims. For example, the composition could include a third or more components. Thus, it would be possible to add other polymers to the blend of polyphenylene oxide and sulfur. Such other polymers could include polystyrene, polyolefins, etc. In addition to this, it would be possible to add pigments to the polymer to get a colored polymer if desired. Other ingredients could possibly include plasticizers, modifiers, etc.

What I claim as new and desire to secure by Letters Patent of the United States is:

1. A polyphenylene oxide polymeric composition comprising
   (a) a polyphenylene oxide having the general formula:

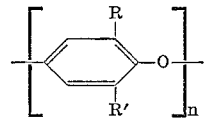

where R is a member selected from the group consisting of hydrogen, hydrocarbon radicals, halohydrocarbon radicals having at least two carbon atoms between the halogen atom and the phenol nucleus, hydrocarbonoxy radicals, and halohydrocarbonoxy radicals having at least two carbon atoms between the halogen atom and phenol nucleus; and R' is the same as R and in addition, halogen; and $n$ is a whole integer of at least 100; and
   (b) from 1–25% by weight elemental sulfur.

2. The polymeric composition of claim 1 wherein R and R' are methyl radicals.

3. The polymeric composition of claim 1 wherein R and R' are phenyl radicals.

4. The polymeric composition of claim 2 wherein the elemental sulfur constitutes from 10–20 weight percent of the composition.

5. A method of dissolving an elemental sulfur extender in a polyphenylene oxide having the general formula:

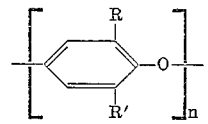

where R is a member selected from the group consisting of hydrogen, hydrocarbon radical, halohydrocarbon radical having at least two carbon atoms between the halogen atom and the phenol nucleus, hydrocarbonoxy radical, and halohydrocarbonoxy radical having at least two carbon atoms between the halogen atom and phenol nucleus; R' is the same as R and in addition halogen and $n$ is a whole number of at least 100, said method comprising the steps of:
   (1) dissolving the polyphenylene oxide in an organic solvent,
   (2) dissolving the elemental sulfur in an organic solvent,
   (3) mixing the two solutions together in the desired ratio to obtain a solution containing polyphenylene oxide and from 1 to 25% by weight elemental sulfur based upon the polyphenylene oxide content, (4) drying the so-formed solution to obtain a residue of polyphenylene oxide having sulfur dissolved therein.

6. The process of claim 5 wherein R and R' are methyl groups.

7. The process of claim 5 wherein the organic solvent for the polyphenylene oxide is chloroform and the solvent for the sulfur is carbon disulphide.

References Cited by the Examiner

UNITED STATES PATENTS

| | | | |
|---|---|---|---|
| 3,221,080 | 11/1965 | Fox | 260—37 |
| 3,262,892 | 7/1966 | Hay | 260—37 |
| 3,262,911 | 7/1966 | Hay | 260—37 |

MORRIS LIEBMAN, *Primary Examiner.*

L. T. JACOBS, *Assistant Examiner.*